United States Patent
Torbert, III et al.

(10) Patent No.: US 11,402,338 B2
(45) Date of Patent: Aug. 2, 2022

(54) SYSTEM AND METHOD OF USING ENERGY CORRELATED TIMING SPECTRA TO LOCATE SUBSURFACE OBJECTS

(71) Applicant: The United States of America, as represented by the Secretary of Agriculture, Washington, DC (US)

(72) Inventors: Henry A. Torbert, III, Opelika, AL (US); Stephen A. Prior, Auburn, AL (US); Aleksandr Kavetskiy, Auburn, AL (US); Galina N. Yakubova, Auburn, AL (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 265 days.

(21) Appl. No.: 16/561,955

(22) Filed: Sep. 5, 2019

(65) Prior Publication Data

US 2020/0072767 A1    Mar. 5, 2020

Related U.S. Application Data

(60) Provisional application No. 62/727,185, filed on Sep. 5, 2018.

(51) Int. Cl.
*G01N 23/04* (2018.01)
*G01V 5/10* (2006.01)
*G01T 1/29* (2006.01)

(52) U.S. Cl.
CPC ........... *G01N 23/04* (2013.01); *G01T 1/2985* (2013.01); *G01V 5/10* (2013.01); *G01N 2223/0745* (2013.01)

(58) Field of Classification Search
CPC ............ G01N 23/04; G01N 2223/0745; G01T 1/2985; G01V 5/10
See application file for complete search history.

(56) References Cited

U.S. PATENT DOCUMENTS

| 5,410,575 A * | 4/1995 | Uhm | G01V 5/0008 |
| | | | 376/159 |
| 9,012,852 B2 * | 4/2015 | Pekarsky | G01V 5/0069 |
| | | | 250/360.1 |

(Continued)

OTHER PUBLICATIONS

Whetstone et al., Use of Multiple Layers of Repeating Material to Effectively Collimate an Isotropic Neutron Source, Apr. 2017, Nuclear Technology, vol. 176, Iss. 3, pp. 395-413. (Year: 2017).*

(Continued)

*Primary Examiner* — David P Porta
*Assistant Examiner* — Jeremy S Valentiner
(74) *Attorney, Agent, or Firm* — John Fado; Robert Jones

(57) ABSTRACT

Multiple tagged neutrons are emitted from an associated particle imaging neutron generator. The tagged neutrons penetrate a target material and interact with the target material nucleus—which emits nucleus-specific gamma rays. A gamma ray detector detects all gamma rays—including the nucleus-specific gamma rays. An alpha-gamma timing spectrum is constructed for all detected gamma rays. For a specific energy level (MeV) corresponding with the target material nucleus, a peak in the alpha gamma timing spectrum indicates the presence of the target material. Based on the peaking time of the gamma rays (due to tagged neutrons interaction with the target material nucleus) in the alpha-gamma timing spectrum for the specific energy level, the distance from the neutron generator to the target material can be calculated. The nucleus-specific gamma ray spectrum data can be effectively collimated by programming the system to detect the gamma rays in a time window corresponding to the peaking time.

17 Claims, 18 Drawing Sheets

(56) References Cited

U.S. PATENT DOCUMENTS

| | | | |
|---|---|---|---|
| 2010/0302034 A1* | 12/2010 | Clements | G01V 5/0008 |
| | | | 340/540 |
| 2012/0019510 A1* | 1/2012 | Bingham | G01V 5/0008 |
| | | | 345/419 |
| 2013/0327933 A1* | 12/2013 | Xu | G01V 5/104 |
| | | | 250/269.2 |
| 2018/0045849 A1* | 2/2018 | Pennison | G01V 5/12 |
| 2019/0094157 A1* | 3/2019 | Cheminet | G01N 23/222 |
| 2021/0208303 A1* | 7/2021 | Jurczyk | G01V 5/101 |

OTHER PUBLICATIONS

Zaitseva et al., Scintillation Properties of Solution-Grown Trans-Stilbene Single Crystals, Jul. 2015, Nuclear Instruments and Methods in Physics Research Section A, vol. 789, pp. 8-15 (Year: 2015).*

* cited by examiner

SYSTEM AND METHOD OF USING ENERGY CORRELATED TIMING SPECTRA TO LOCATE SUBSURFACE OBJECTS

CROSS-REFERENCE TO RELATED APPLICATIONS

This disclosure claims priority to U.S. Provisional Patent Application No. 62/727,185, filed on Sep. 5, 2018, which is hereby incorporated by reference herein in its entirety.

FIELD OF THE INVENTION

The disclosed system and method described herein comprises a neutron emitter and associated particle imaging system (API) that may be used to locate subsurface objects. Specifically, the method and system described herein relates to using an API system to measure an alpha-gamma coincidence (timing) spectra, time correlated energy gamma spectra, and energy correlated timing spectra to specifically locate subsurface objects such as carbon bricks.

BACKGROUND OF THE INVENTION

API systems in combination with existing target neutron techniques are currently used to detect hidden materials such as explosives, fissile materials, and narcotics [1-5]. One advantage of this technique is the relatively high signal to noise ratio compared to other neutron-gamma analysis methods [6]. This higher ratio is due to the neutron stimulated gamma response that is essentially only from the sample—as the measuring apparatus is functioning in the alpha-gamma coincidence mode.

The system described herein comprises an API experimental setup/configuration with nanosecond-operated electronics. The system uses a non-invasive soil carbon analysis technique to more specifically locate a target object within a conical investigated area. The system can also be used locate non-carbon objects. A typical API setup has the capability to measure alpha-gamma coincidence (timing spectra) and time correlated gamma energy spectra. The system described herein is also designed to measure distance as a function of time via an energy-correlated timing spectra.

The system relates the time of peak appearance in the energy correlated timing spectra, to the distance to a specific location and depth of a target sample (such as a carbon brick). Proof of proper operation of the current setup was based on evaluating the value of neutron speed restoration. Experimental results of energy correlated timing spectra for mono-elemental samples (primarily of carbon), and comparison of setup characteristics (sensitivity, signal-to-noise ratio (SNR), minimal detectible level (MDL)) in different modes (continuous, API) were also assessed.

SUMMARY OF THE INVENTION

This disclosure is directed to a nondestructive method of identifying buried target material. In accordance with the method, the inventors use a field-portable device for making non-invasive measurements to identify elemental content in an investigated area. Specifically, the device comprises a neutron generator with an associate particle alpha detector (known as an Associated Particle Imaging system (API)).

At the start of the investigation process (i.e. the method), the device is positioned above a buried target material in an investigated area. Multiple tagged neutrons are emitted from the associated particle imaging neutron generator. The tagged neutrons penetrate a target material and interact with the target material nucleus—which emits nucleus-specific gamma rays. A gamma ray detector detects all gamma rays—including the nucleus-specific gamma rays. An alpha-gamma timing spectrum is constructed for all detected gamma rays. For a specific energy level (MeV) corresponding with the target material nucleus, a peak in the alpha gamma timing spectrum indicates the presence of the target gamma material. Based on the peaking time of the gamma rays (due to tagged neutrons interaction with the target material nucleus) in the alpha-gamma timing spectrum for the specific energy level, the distance from the neutron generator to the target material can be calculated. The nucleus-specific gamma ray spectrum data can be effectively collimated by programming the system to detect the gamma rays in a time window corresponding to the peaking time.

BRIEF DESCRIPTION OF THE DRAWINGS

FIG. 10A shows a time window width 1 ns, location varied; FIG. 10B shows a centroid of time window location at 35 ns, at varying widths. The energy window for area calculation is shown by arrows.

DETAILED DESCRIPTION OF PREFERRED EMBODIMENTS

Figure 1A:
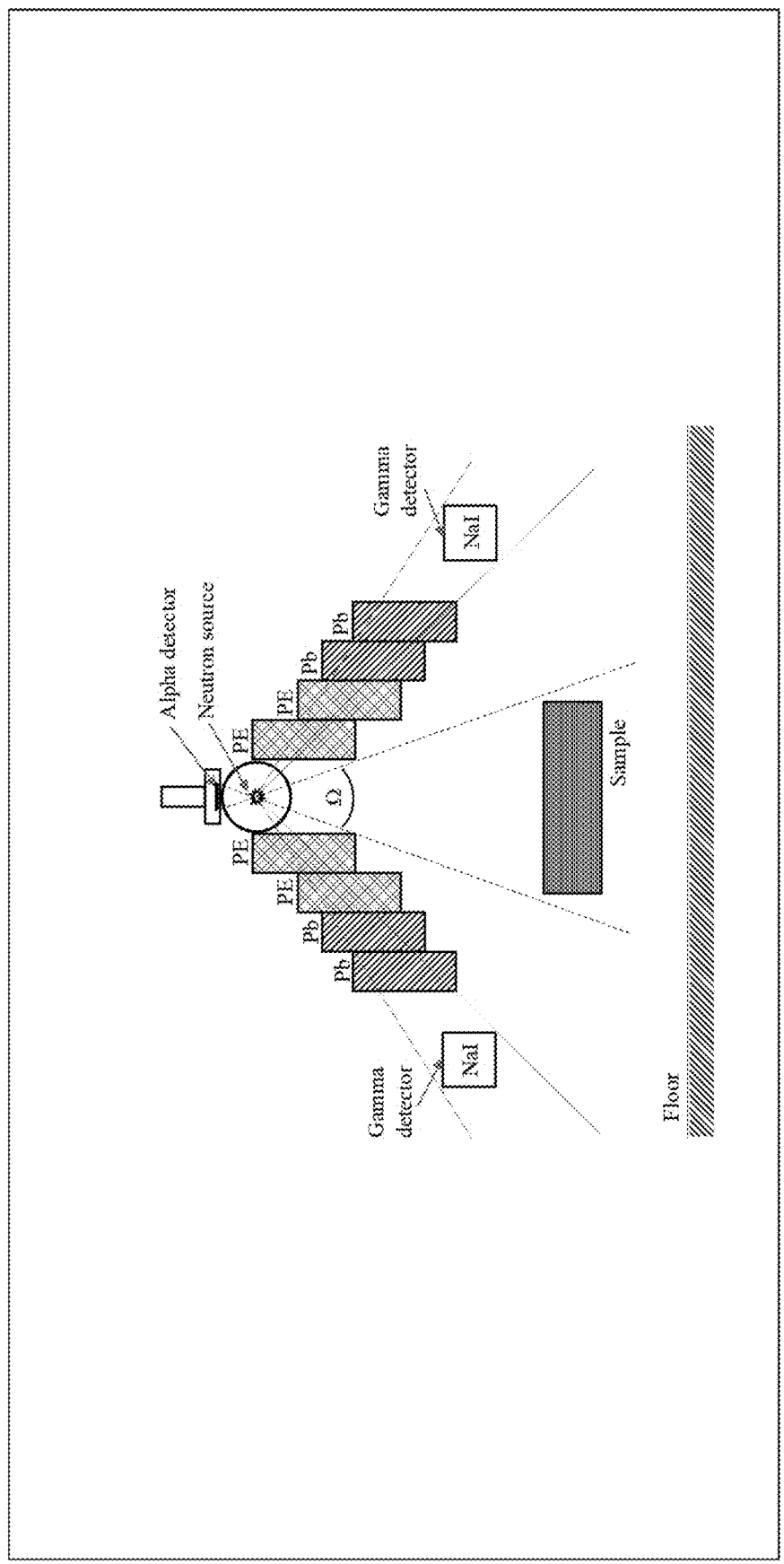
FIG. 1A shows a schematic arrangement of a neutron generator, shielding, and detectos in an API setup. "PE" is a polyethylene block, "Pb" is a lead block, and $\Omega$ is a cone solid angle that generally defines an area of investigation.
Figure 1B:
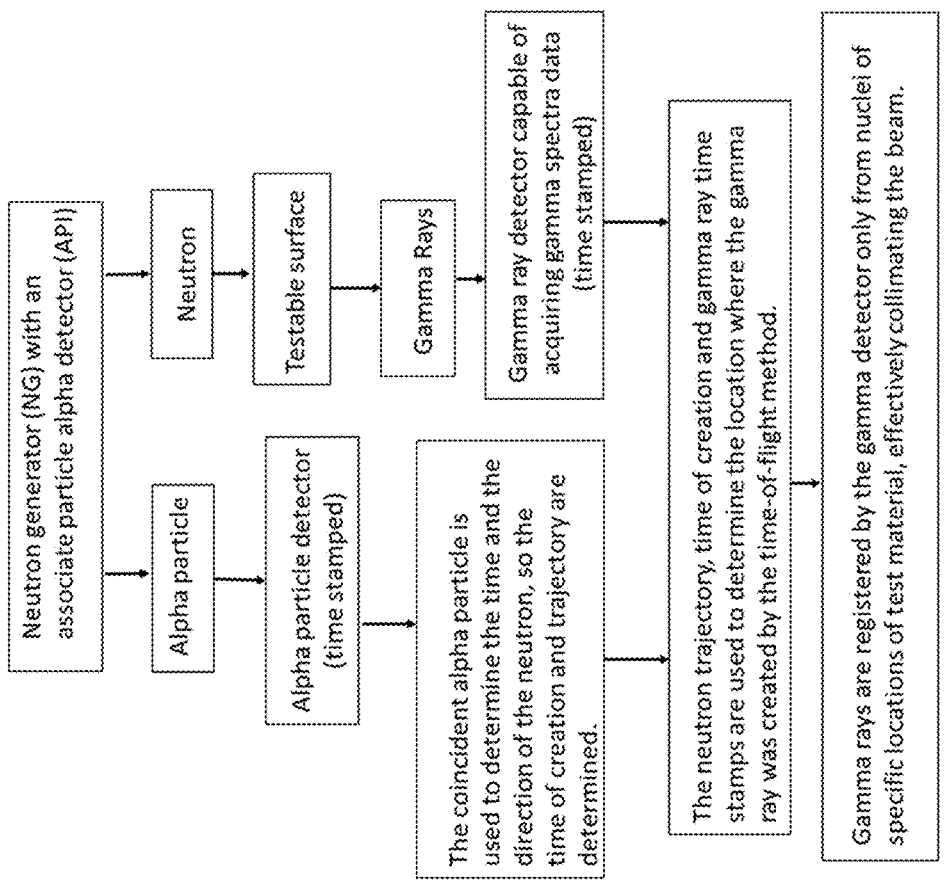
FIG. 1B shows a flow chart that describes one embodiment of the preferred method.

Neutron generators used with API systems produce neutron flux by accelerating deuterium ions into a tritium target. This reaction produces "coincidental" neutrons and alpha particles at 14.1 and 3.5 MeV, respectively, which are generated nearly "back-to-back" at a production point in the tritium target. The correlation of the neutrons with the alpha particles is used to "tag" (i.e. designate/mark) a specific cone fraction of the emitted neutrons. The neutron cone fraction is defined by the geometry of a built-in alpha detector within the neutron generator (see FIG. 1A).

The alpha detector detects the alpha-particles associated with the "tagged" (i.e. coincidental) neutrons. The neutrons interact with the nuclei of the investigated target material, and the target emits nucleus-specific gamma rays that can be detected/registered by the gamma detectors. The time difference between detection of a coincidental alpha particle and the detection of the corresponding gamma radiation correlates to distance traveled by the emitted coincidental neutron before the neutron is scattered by a nucleus in the target object (14.1 MeV neutrons travel at 5.2 cm/ns vs gamma rays at 30 cm/ns).

The energy spectrum of the gamma rays provides a means of identifying the element that scattered the neutrons, and the time delay between detecting the gamma-rays associated with a selected target (like a carbon brick) and the coincidental alpha particle (corresponding to neutron time-of-flight) indicates the position within the investigation cone (see FIG. 1A) where the neutron impacted the target material and scattered the gamma rays. This information, along with directional data from the position-sensitive alpha detector enables an investigator to identify the composition and position of the targeted material.

The inventors adapted this method to design an apparatus/system that provides a device for making non-invasive measurements of elemental content of any substances under consideration. In the preferred embodiment, the inventors' device (at least) measures carbon. The device is a portable field unit using a neutron generator positioned above the surface of an area of investigation to generate fast neutrons that penetrate an area of investigation and (preferably) a target material nucleus within the area. The apparatus uses a neutron generator which also detects the coincidental alpha particles produced simultaneously with the coincidental neutrons (per FIG. 1A). The emitted neutrons interact with the test material and generate gamma rays from inelastic neutron scattering with the target nuclei. The instrumentation apparatus/system includes gamma detectors which can measure the energy correlated timing spectrum. The precise electronics of the instrument allows the detection of gamma along with the time of arrival.

For the purposes of this disclosure, "coincidental neutrons" and "coincidental alpha particles" are defined as simultaneously created by a neutron generator (for example the neutron generator described herein). Upon creation, the coincidental neutron and the coincidental alpha particle instantaneously move in opposite directions at known speeds with precisely opposite trajectories.

By tracking coincident alpha particles, the creation time and trajectory of coincidental neutrons can be determined. The gamma detection along with the alpha detection can be used to establish the alpha-gamma coincidence event time distribution of the neutrons—particularly those neutrons that impact a target material nucleus. With the collected data, the gamma rays that are registered by the gamma detector can be isolated to only consider the gamma emitted from a specific target area in study material nuclei. The alpha-gamma coincidence event time distribution data is collected and filtered to (in-effect) produce an "electronic" collimating of the neutron beam to measure the gamma energy spectrum of an investigated area. This specific gamma ray energy spectra can then be utilized to determine the elemental content of the specific target material in the investigated area.

Method Description

For the purposes of this disclosure, when a "tagged neutrons" is emitted from a neutron generator, a corresponding "tagged alpha particle" is also emitted. A tagged neutron and corresponding tagged alpha particle have a simultaneous (identical) emission times but opposite trajectories.

For the purposes of this disclosure, a "tagged event" comprises an event where a neutron generator emits a tagged neutron (and a tagged alpha particle) and the tagged neutron impacts a target nucleus; and, the target nucleus emits gamma rays which are detected by a gamma ray detector.

For the purposes of this disclosure, an "alpha gamma event time" is the amount of time it takes to complete a tagged event.

Applicant hereby discloses a nondestructive method of identifying a buried target material, the steps of the method comprising:

(a) providing a field-portable device for making non-invasive measurements of elemental content using a neutron generator with an associate particle alpha detector (known as an Associated Particle Imaging system (API));

(b) positioning the device above a buried target material in an investigated area;

(c) emitting at least one tagged neutron and a corresponding tagged alpha particle from a source on the device neutron generator;

(d) detecting the tagged alpha particle with an alpha particle detector and recording the tagged alpha particle emission time and trajectory as comprising tagged alpha particle data;

(e) using the tagged alpha particle data to determine the corresponding tagged neutron emission time and trajectory, and recording the tagged neutron emission time and trajectory as tagged neutron data;

(f) penetrating the target material with a tagged neutron so that the neutron interacts with a target material nucleus, and the interaction causes an emission of nucleus-specific gamma rays from inelastic neutron scattering;

(g) registering/detecting the nucleus-specific gamma rays at a gamma detector on the device to complete a tagged event;

(h) recording an alpha-gamma event time for the tagged event, the collective alpha-gamma event times for all tagged events comprising an alpha-gamma event time distribution;

(i) examining the alpha-gamma event time distribution spectra for peaks (from buried material) and determining a peak occurrence time;

(j) measuring alpha-gamma event time distribution spectra to determine differences in the neutron emission time, and occurrence time of the nucleus-specific gamma spectra peak, the measured time corresponding to a distance traveled by the tagged neutron to the target material nucleus, and distance traveled by nucleus-specific gamma rays to the gamma detector (assuming a known neutron and gamma speed);

(k) utilizing the measured time to determine distance from the neutron generator neutron source to the buried material in the investigated area.

(l) utilizing time correlated energy spectra within specific time increments to "collimate" data for examination of buried material.

(m) comparing observed time correlated energy spectra to known reference material time correlated energy spectra to determine element content of buried material.

Example System

The inventors' instrumentation apparatus/system was comprised an API120 portable neutron generator (Thermo Fisher scientific, CO) that provides $10^7$ n/s neutron flux with energy of 14 MeV. The design and characteristics of the selected generator are known in the art [6, 7]. The yttrium aluminum perovskite (YAP) alpha scintillator used in the selected generator (~0.5 mm thick [6]) covers the inner surface of a sapphire window. The vacuum-deposited silver layer (~1 mg/cm$^2$) on the scintillator guarantees light tightness and protection from side scattered deuteron ions inside the generator [6]. The YAP is also known as yttrium ortho aluminate, YAP:Ce, or Ce:YAlO3. YAP is a fast (decay constant 27 ns [8]), mechanically strong, and chemically resistant scintillation material. The open surface of the sapphire window has a diameter of 44.5 mm and a window with an alpha scintillator positioned 57 mm from the center of the tritium target.

A Hamamatsu R13089 fast photomultiplier (PMT) was used for alpha scintillation registration. This PMT was installed directly on the window using optical silicon grease (SS-988 Optical Coupling Gel, Silicone Solutions, OH) for optical contact and fully covers the sapphire window. This arrangement provides a cone solid angle ($\Omega$~0.41 sr) in which the alpha particle signals and gamma rays were acquired.

The neutron generator was mounted on a metal frame so that the cone axis was oriented practically vertically downward. A gamma detector comprising a sodium iodide-activated (NaI(Tl), decay constant 250 ns [9]) scintillation crystal sizes of 10 cm×10 cm×48 cm was used for gamma ray measurement. A polyethylene-lead shielding protected the gamma detector from direct neutron flux. The total polyethylene and lead thicknesses are (collectively), about 15 cm each. The shielding was positioned between the neutron generator and gamma detector. The relative arrangement of the neutron generator (i.e. neutron source), polyethylene-lead shielding, and the sodium iodide gamma ray detectors is generally shown in FIG. 1A. One detector was used for the measurements presented in this disclosure. Second detector can be used together with first to improve characteristics of the system.

Figure 1C:
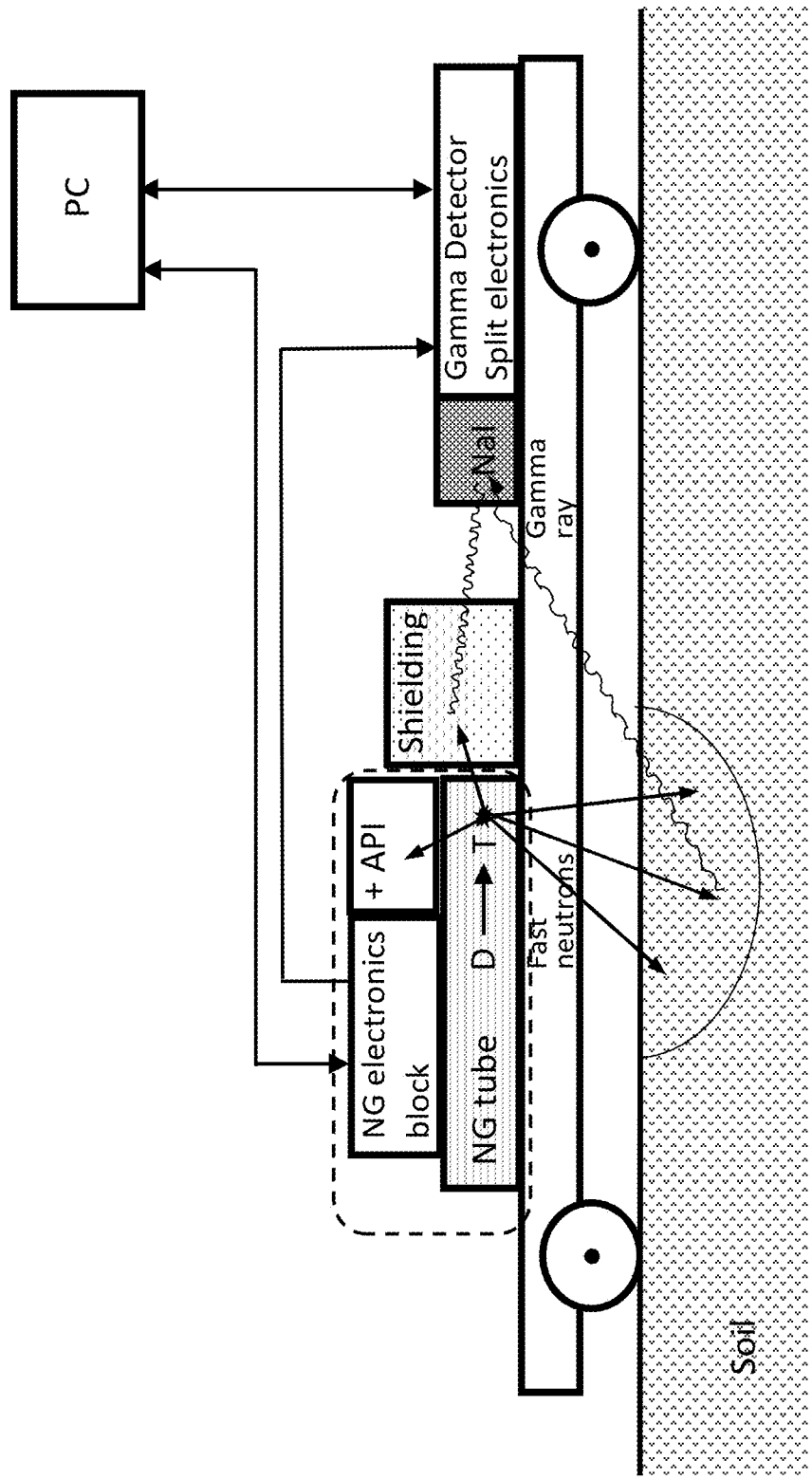
FIG. 1C shows a schematic of a field-portable embodiment of the device for making non-invasive measurements of elemental content using a neutron generator with an associate particle alpha detector

The inventors' apparatus/system (as generally shown in FIG. 1C) was initially tested by suspending the apparatus from a crane and raising the apparatus about 3 m above the concrete laboratory floor. A sample carbon brick was positioned under the neutron generator as generally shown in FIG. 1A. Alternatively, several samples/bricks could be situated according to a multi-sample scheme that will be described later (see FIG. 5). During the testing, measurement time was dependent on the spectra acquisition count rate reaching a suitable count statistic. Measurement time generally ranged between 3 to 20 minutes during the initial tests.

Figure 2:
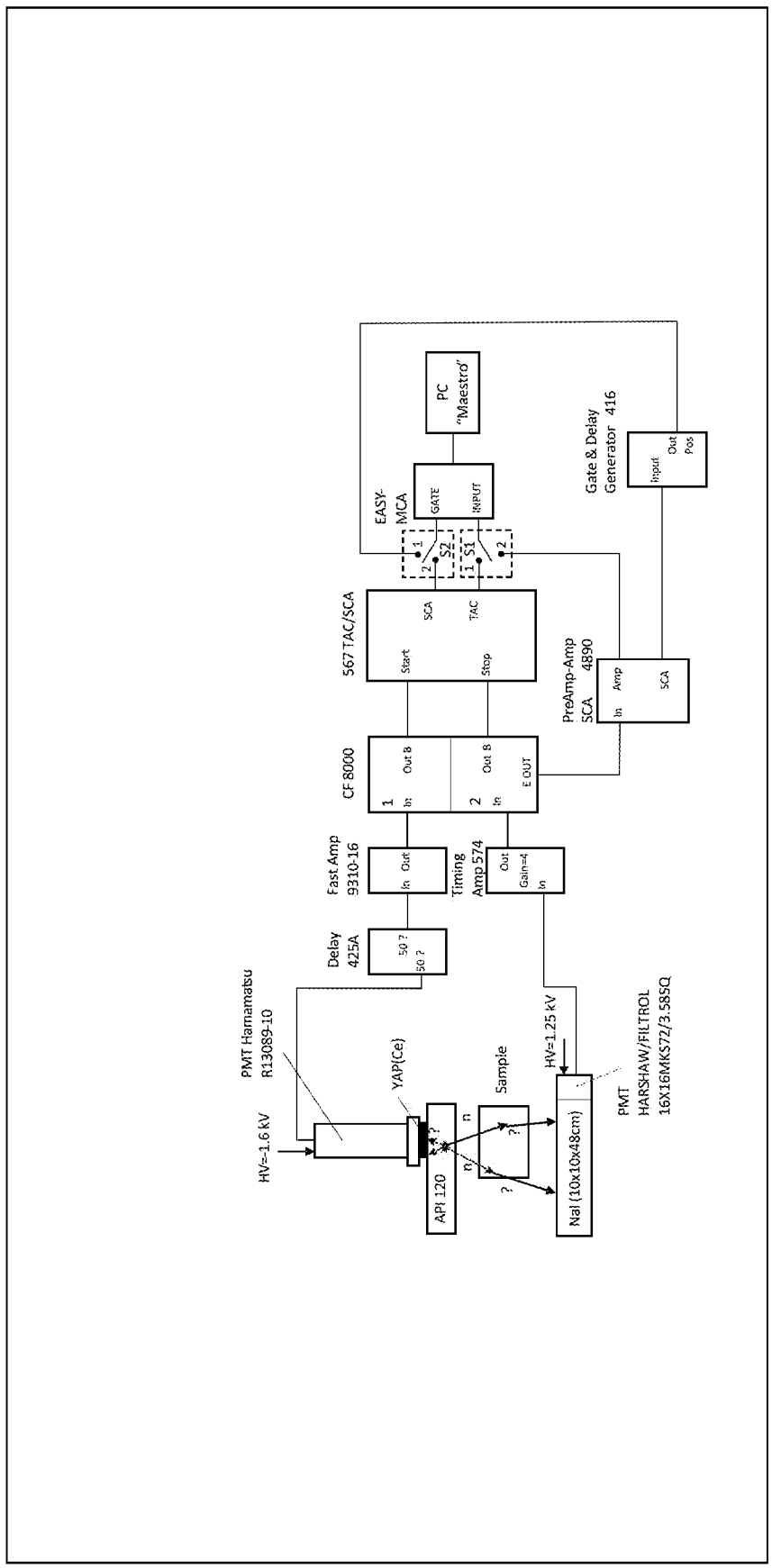
FIG. 2 is an electrical schematic block diagram showing the configuration of the API electronics used in the current system.

The inventors' apparatus used conventional laboratory electronics based on Nuclear Instrumentation Modules (NIM) to measure gamma spectra energy, alpha-gamma coincidence (timing) spectra, energy-time correlated gamma spectra, and energy correlated timing spectra. The electronic portion of the API experimental system/apparatus was developed based on a block-scheme [10]. The electrical schematic for the system is shown in FIG. 2. High voltage power supply units (Model 556 ORTEC) were used to power PMTs in both the alpha (negative) and gamma (positive) detectors. Anode signals from the alpha detector PMT (operational voltage of 1.61 kV) were passed through a delay line (ORTEC 425A) and fast amplifier (ORTEC 9310-16) before being fed into a constant fraction discriminator unit (ORTEC CF 8000). The discriminator unit marked the arrival time of detected events with high precision.

As shown in FIG. 2, the alpha channel was fed to the START input of a time-to-amplitude convertor (ORTEC 567 TAC/SCA). The anode signals from the gamma detector PMT were fed through a timing amplifier (ORTEC timing amplifier 574) with a gain equal to 4 into a constant fraction discriminator unit (ORTEC CF 8000). This gain increased the gamma pulse amplitudes from the gamma detector PMT at the applied voltage 1.25 kV, which was sufficient for constant fraction discriminator unit operation.

The gamma detector channel was fed to the STOP input of a time-to-amplitude convertor. The time difference between START and STOP channels was converted to an amplitude pulse and recorded by a multi-channel analyzer (ORTEC, Easy-MCA 8K) as the alpha-gamma coincidence timing spectrum. A single channel analyzer (SCA) built into the time-to-amplitude converter (TAC) unit allowed the setting of time windows to gate the multi-channel analyzer (MCA) to record the corresponding time correlated gamma-ray energy spectrum.

As further shown in FIG. 2, the energy spectra from the "E out" output of constant fraction discriminator unit was shaped by an ORTEC Preamp-amp SCA 4890 amplifier and fed to the Easy-MCA 8K input gate. The 4890 amplifier has a built-in SCA that allows the setting of energy windows to gate the MCA for recording the corresponding energy correlated timing spectra. Pulses from the SCA fed to the MCA gate through an ORTEC Gate and Delay Generator 416 provide registration of alpha-gamma time difference pulses coinciding with energy window pulses. The measurement mode is selected by the combination of the S1 and S2 switch positions and the gating function of the analog-digital converter (ADC) in the MCA.

As noted above, graphite bricks were used as target material for measuring the different spectra types. During testing, these bricks primarily comprised rectangular parallelepipeds (30 cm×30 cm×5 cm) each with a mass of 8.6 kg.

The inventors confirmed the proper operation of the measurement system prior to initiating the measurement process. Time of peak appearance in the API timing spectra (peaking time) relates to neutron "time-of-flight" from source to sample. Peaking time is defined as the sum of the neutron time-of-flight, plus the gamma time-of-flight from sample to gamma detector, and a constant delay time of PMT signals passing in the electronic blocks described in (for example) FIG. 2. The speed of neutrons can be found from the dependence of the peaking time versus source-to-sample distance as the reverse value of this dependence derivative. The proper operation of the API system/setup can be confirmed if the neutron speed at the source is equal or very close to 5.2 cm/ns (speed of 14.1 MeV neutrons).

Figure 3:
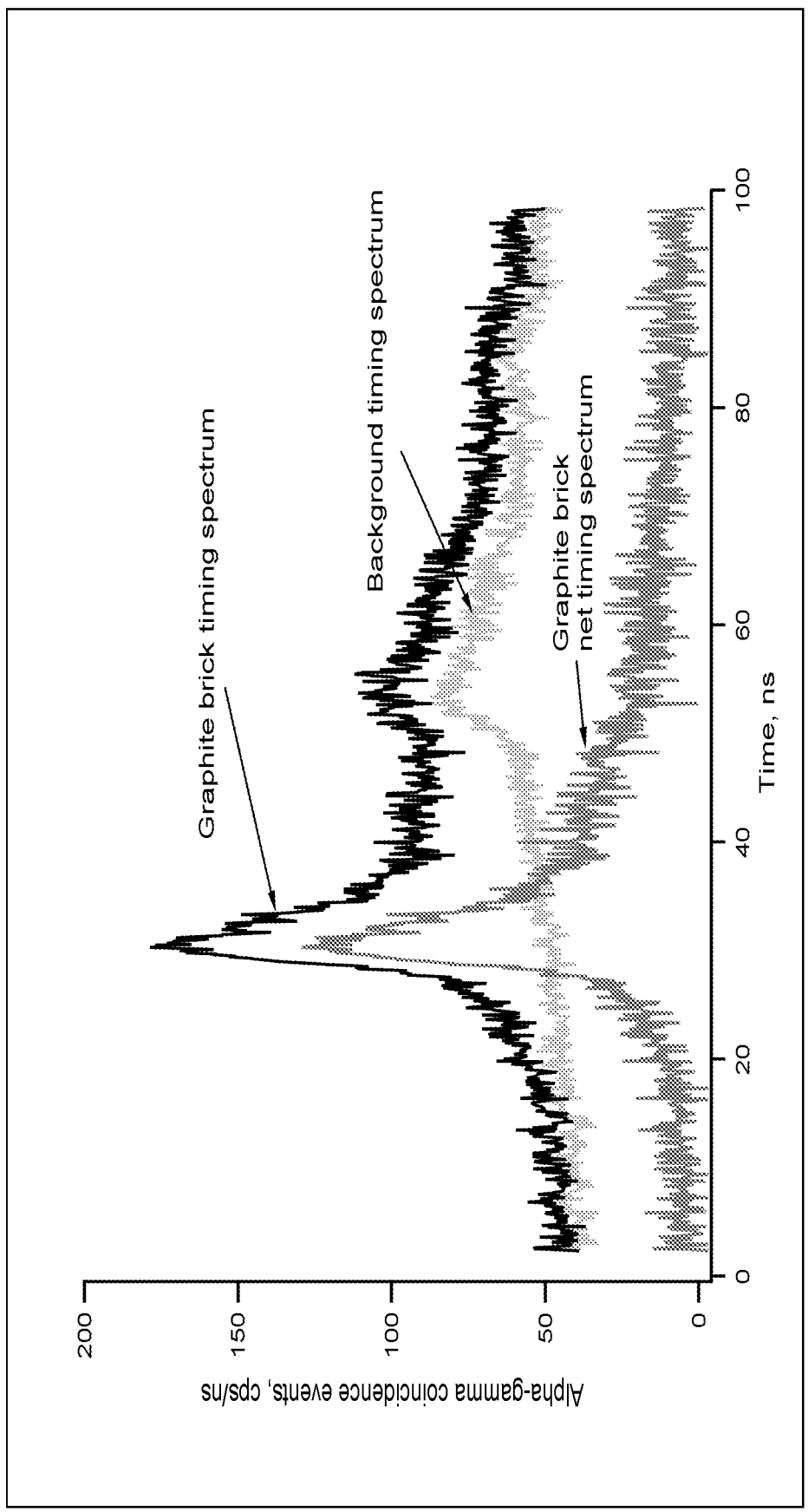
FIG. 3 shows experimental data describing the alpha-gamma coincidence event time distribution (i.e. the timing spectrum) acquired during a demonstration of the current system. A carbon brick is the target material of the system analysis.
Figure 4A:
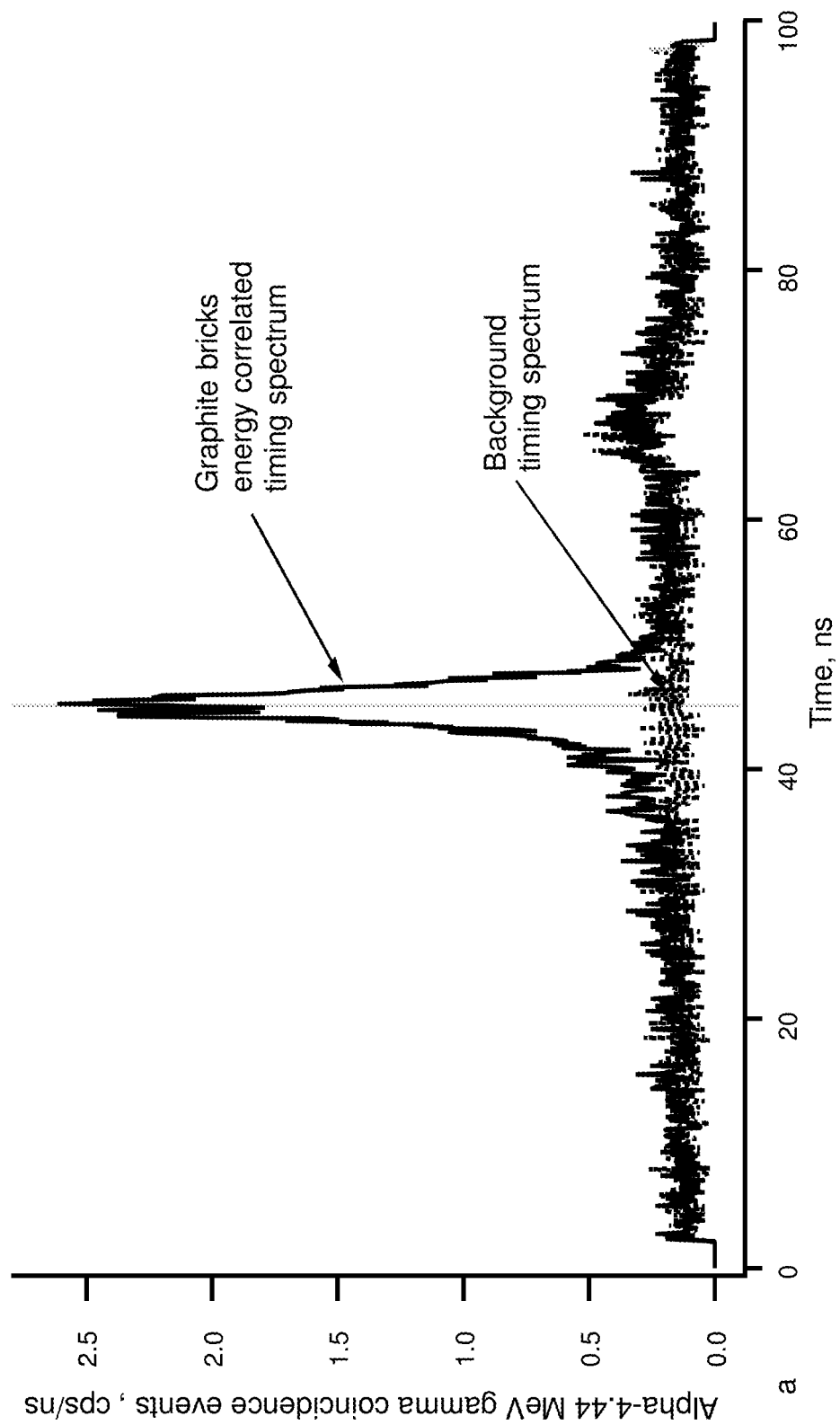
FIG. 4A is a graph showing a 4.4 MeV energy correlated timing spectrum with the peak showing the location of target graphite bricks.

Examples of alpha—all gammas coincidence events (timing) spectrum and alpha—particular (4.44 MeV) gammas coincidence events (energy correlated timing, ~0.25 MeV window centered at 4.44 MeV) spectrum of graphite bricks measured with the above described configuration/setup are shown in FIGS. 3 and 4. The background spectra and net spectra (difference between sample and background spectra) are also shown in FIGS. 3, 4. As can be seen from these examples, both the graphite brick timing spectrum and energy correlated timing spectrum have two peaks. The right peak can be attributed to the gamma signal from the laboratory floor—since a peak at this time is also present in the background spectra. The left peak can be attributed to the sample.

The net spectra are the gamma response spectra that reflect the results of neutron interactions with sample only. The net graphite timing spectrum is represented by the relatively wide irregularly shaped band shown in FIG. 3. This band consists of the main coincidence peak corresponding to the gamma rays produced in the sample. The broad structure following the main peak is due to neutrons scattered by the sample that hit the surrounding materials and produced gammas [11-14]. The maximum alpha-gamma coincidence time shown in this spectrum is the FIG. 3 peaking time. However, peaking time is not particularly accurate and has an error range of several nanoseconds. Specifically, FIG. 3 shows the alpha-gamma coincidence event time distribution (timing spectrum, measurement time ~5 min each) for graphite brick (black), background (light gray), and difference between these spectra (net timing spectrum, dark gray). The FIG. 3 source-to-sample distance is 66 cm.

Figure 4B:
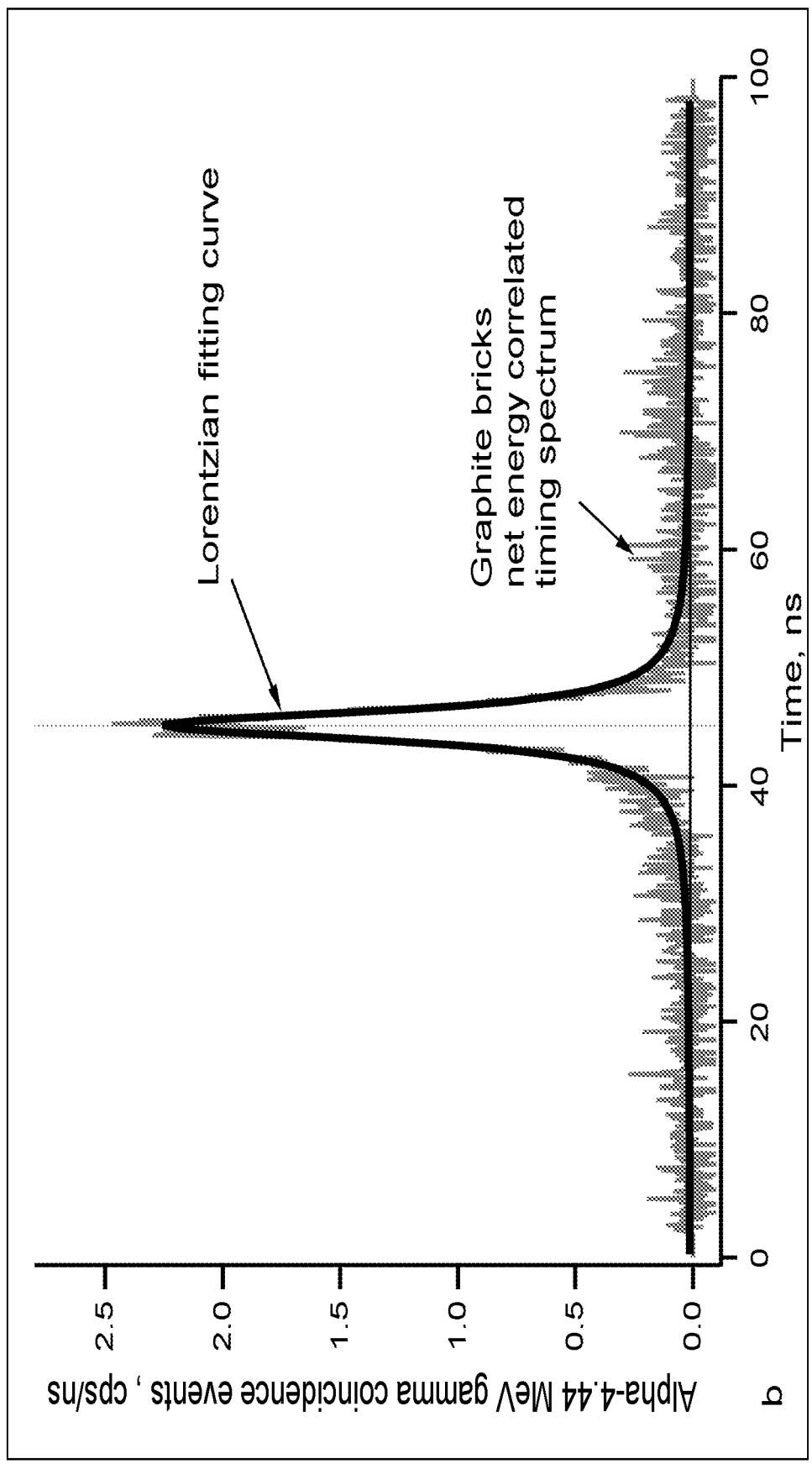
FIG. 4B shows the data of FIG. 4A fitted with a Lorentzian curve.

FIG. 4 shows 4.44 MeV energy correlated timing spectrum of 4 graphite bricks at a 121 cm source-to-sample distance, and background timing spectrum (measurement time ~20 min each). The net graphite energy correlated timing spectrum is represented by a relatively narrow peak, as shown in FIG. 4B. FIG. 4B shows that the net graphite energy peak can be relatively accurately approximated by a Lorentzian curve. The Lorentzian centroid can be determined with relatively high accuracy (±0.3 ns) and can be taken as peaking time. Accuracy of peaking time position was determined from multiple measurements and Lorentzian approximations of the net graphite energy correlated timing spectrum. Significantly, the inventors found that the energy correlated timing spectrum can be used to find dependency of peaking time with distance.

Experimental Process and Results

In the inventors' first experiment for determining peaking time-distance dependence, four carbon bricks were placed on an adjustable platform beneath the neutron source (generator) as schematically shown in FIG. 1A. Energy correlated timing spectra (4.44 MeV) were measured at different neutron source-to-sample distances. Peaking times were determined by approximating the net spectra with a Lorentzian shape (FIG. 4B). Acquired data were used to plot dependence of the carbon peaking time in energy correlated timing spectra versus distance.

Figure 5:
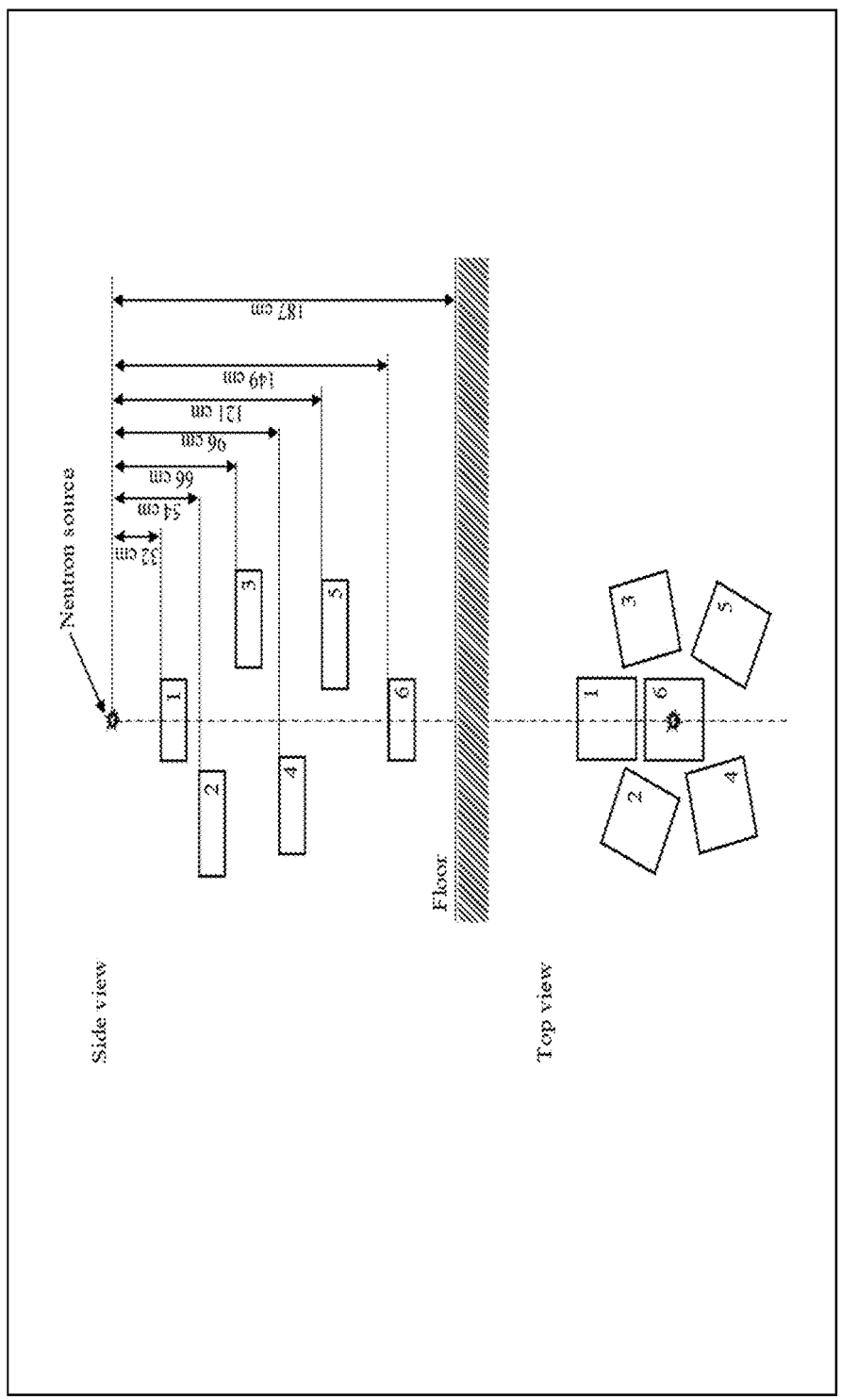
FIG. 5 shows the disposition of six graphite bricks at a measurement of energy (4.44 MeV, C) correlated timing spectra.
Figure 6:
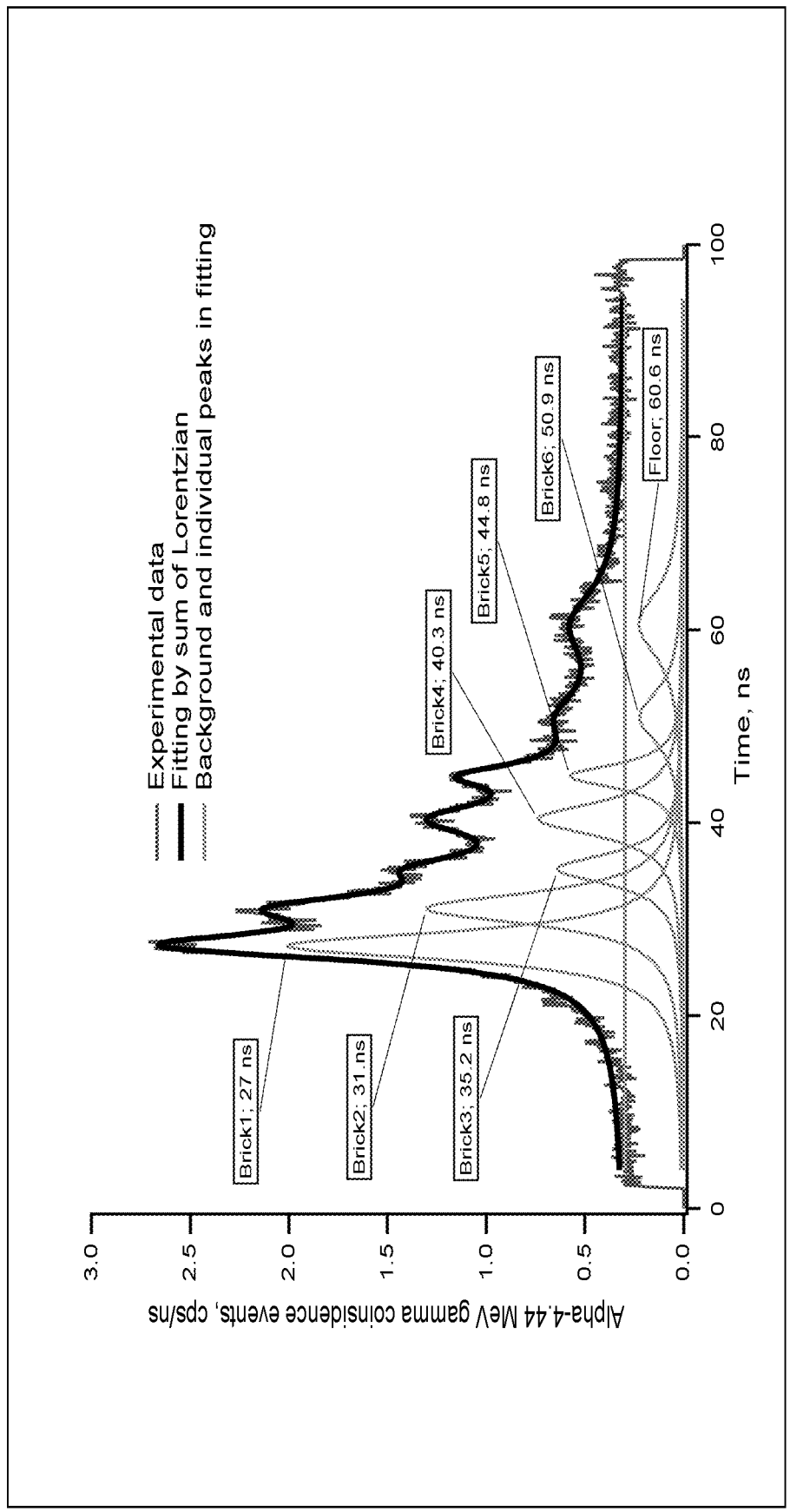
FIG. 6 shows the Energy 4.44 MeV correlated timing spectra of six graphite bricks shown in FIG. 5.

In the second experiment, six graphite bricks were located at different distances from the neutron source as shown in FIG. 5. After adjusting the energy window around the carbon peak (~0.25 MeV window centered at 4.44 MeV) the energy correlated timing spectrum was measured. As shown in FIG. 6, the spectrum can be approximated by the sum of the seven Lorentzian shape peaks. The first six peaks were proven to be attributable to the graphite bricks by sequentially removing each brick and repeating the measurement. Each of the six peaks disappear upon removal of the corresponding brick, while the last peak (centroid around 60 ns) never disappeared and can be attributed to the concrete laboratory floor. This peak remains in the background spectra when all bricks are removed. Data associated with peaking time and distance were used to plot dependence of the carbon peaking time in energy correlated timing spectra versus distance.

Figure 7:
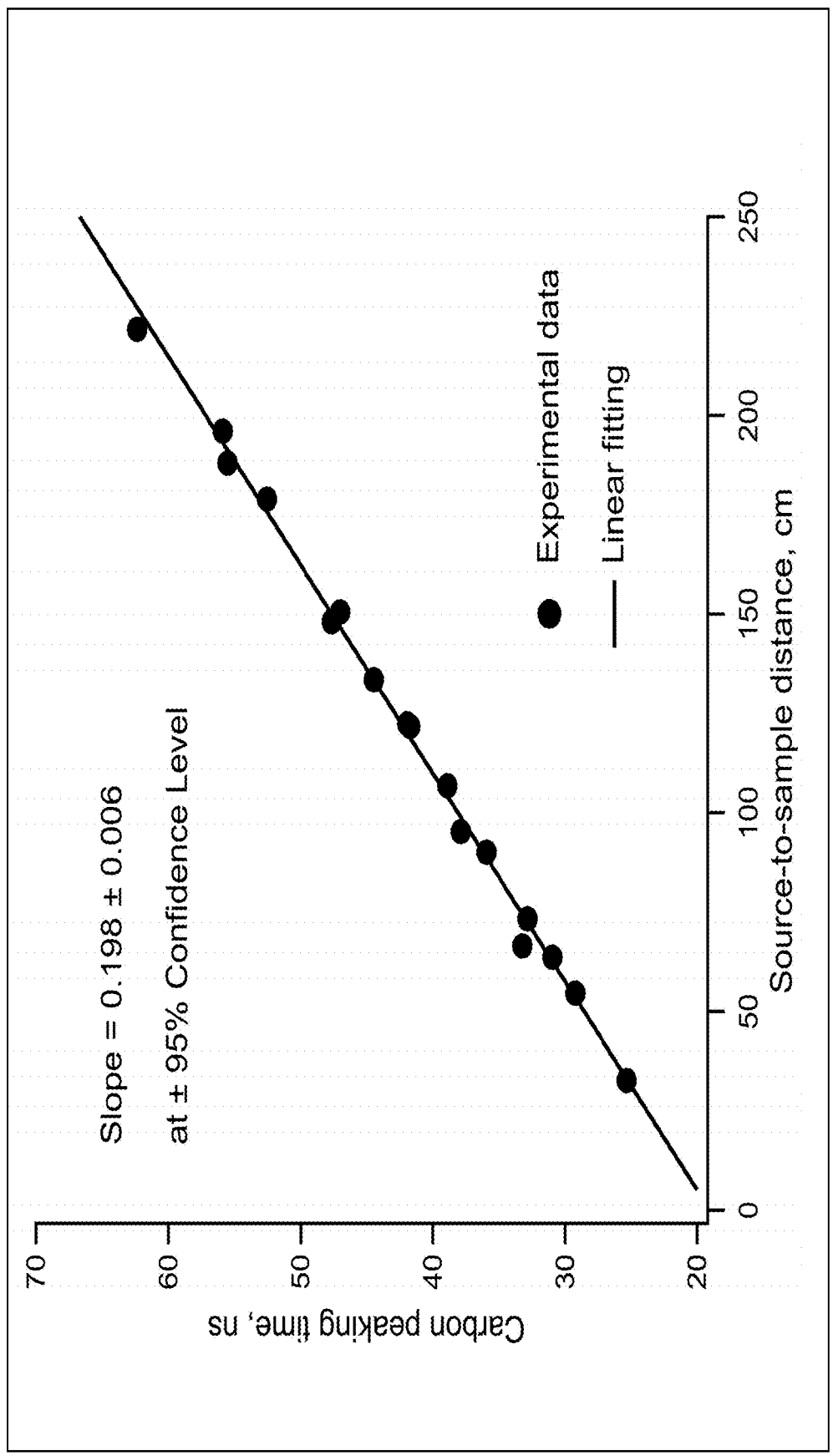
FIG. 7 shows the relationship between carbon peaking time and the source-to-sample distance.

Data from both experiments were combined, and the dependence of peaking time in the carbon energy correlated timing spectrum versus source-to-sample distance was plotted, as shown in FIG. 7. Specifically, FIG. 7 shows the relationship of carbon peaking time in the energy correlated timing spectra to the source-to-sample distance. The peaking times were corrected based on gamma time-of-flight from sample to gamma detector. These amendments were calculated as distance from sample to detector (based on source-to-sample distance, and source-to-gamma detector distance (as shown in FIG. 1A), divided by the gamma speed of 30 cm/ns. Slope of fitted straight line in FIG. 7 has a confidence level of 0.95. The inverse value of the derivative of the peaking time versus source-to-sample distance dependence reflects the neutron speed.

The defined value of 5.24±0.18 cm/ns is the speed of neutrons emitted by the generator. The speed of 14.1 MeV neutrons, calculated as $V(cm \cdot ns^{(-1)}) = 1.383 \cdot \sqrt{(E(MeV))}$, is the same. This independent neutron speed measurement supports/confirms proper system setup configuration and authenticates the measured results. Note, that the defined dependence of carbon peaking time in the energy correlated timing spectra versus source-to-sample distance can be used for detection of carbon in air.

After validating that the API apparatus/system setup works properly, metrological parameters in different measurement modes were estimated. For this purpose, the inventors make measurements of the gamma energy spectra in both the API mode, and in a "continuous mode" (non-alpha-gamma-coincidences mode where the time correlation is not considered, but spectra are continuously collected). The measurements were made with the carbon brick(s) located 66 cm from the neutron source. To establish a baseline, the inventors also made background measurements without the presence of carbon bricks.

For the purposes of this disclosure, the continuous mode is defined as a non-alpha-gamma-coincidences mode, where the time correlation between alpha particles and neutrons is not considered, but gamma ray spectra are continuously collected.

Figure 8:
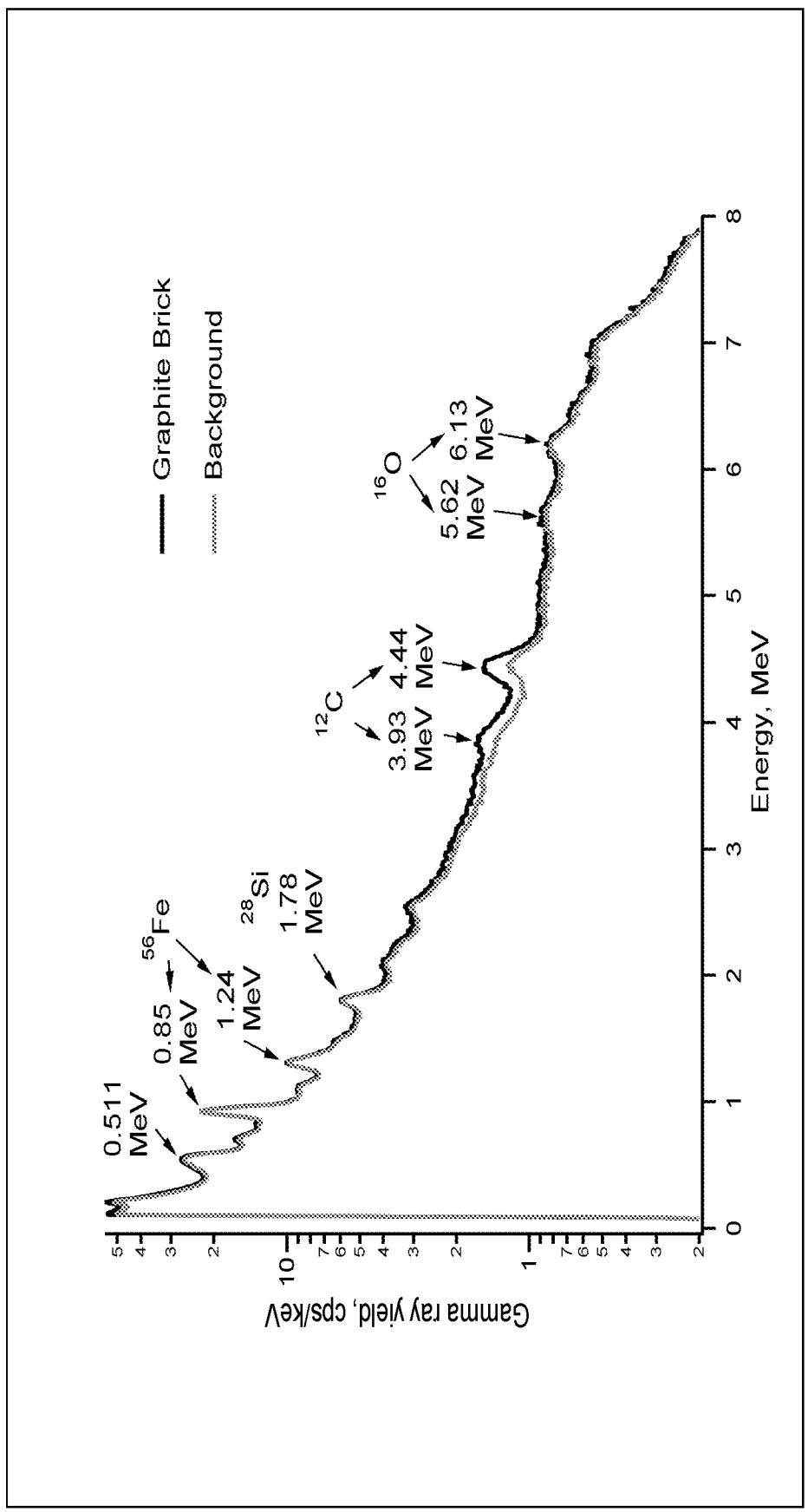
FIG. 8 shows the gamma spectra of background and graphite brick measured in the continuous mode.

Energy spectra in the continuous mode is shown in FIG. 8. The background energy spectrum (mainly from inelastic neutron scattering) consists of gamma lines and their derived components (i.e., Compton scattering, pair production, single escape lines) due to gamma ray interaction with the detector. These lines are associated with setup construction materials (primarily shielding) and laboratory floor nuclei such as: oxygen-16 at 6.13 MeV and 5.62 MeV, carbon-12 at 4.44 MeV and 3.93 MeV, silicon-28 at 1.78 MeV, iron-56 at 0.85 MeV and 1.24 MeV, and pair production peak at 0.51 MeV (for a list of the gamma energies of nuclei see [15] as an example). The addition of graphite sample results increased spectral intensity in the carbon-12 range (FIG. 8 upper line).

Figure 9:
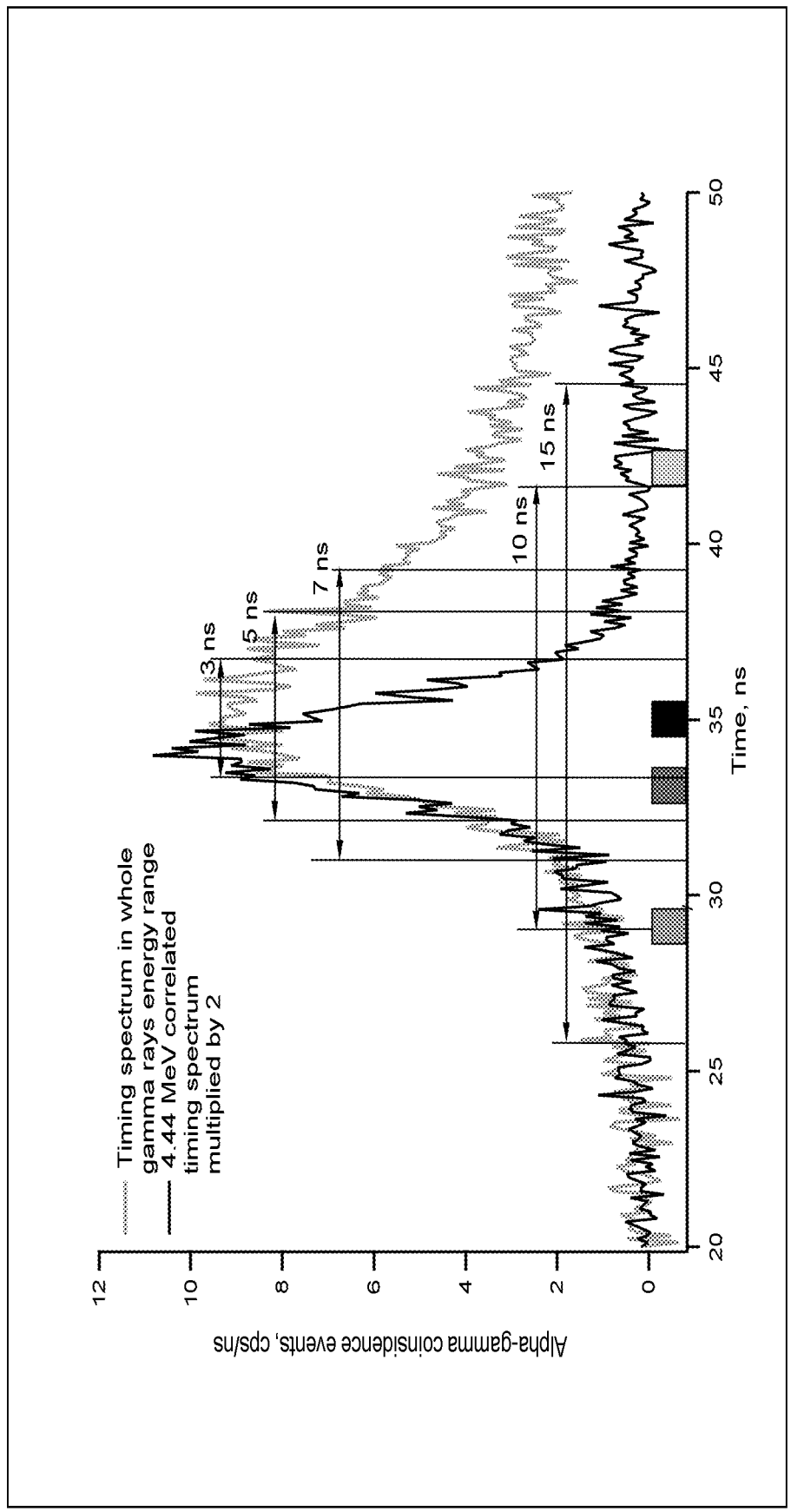
FIG. 9 shows the net timing spectra of a graphite sample for the whole gamma ray energy range and for 4.44 MeV gamma rays. Lines with arrows and rectangles (width 1 ns) mark the timing windows for the measured gamma spectra.

The time window must first be selected when measuring the time correlated energy gamma spectra. Two series of measurements were conducted using different time windows. One case used a narrow (1 ns) time window moving along the time axis. In the second case, the center of the time window coincides with the centroid of peak in the energy correlated timing spectrum (see FIG. 9), and its width is varied. Specifically, FIG. 9 shows the net timing spectra of graphite sample for the whole gamma ray energy range (gray) and for 4.44 MeV gamma rays (black). Lines with arrow (different width) and rectangles (width 1 ns) mark the timing windows for the measured gamma spectra shown in FIG. 10.

Figure 10A:
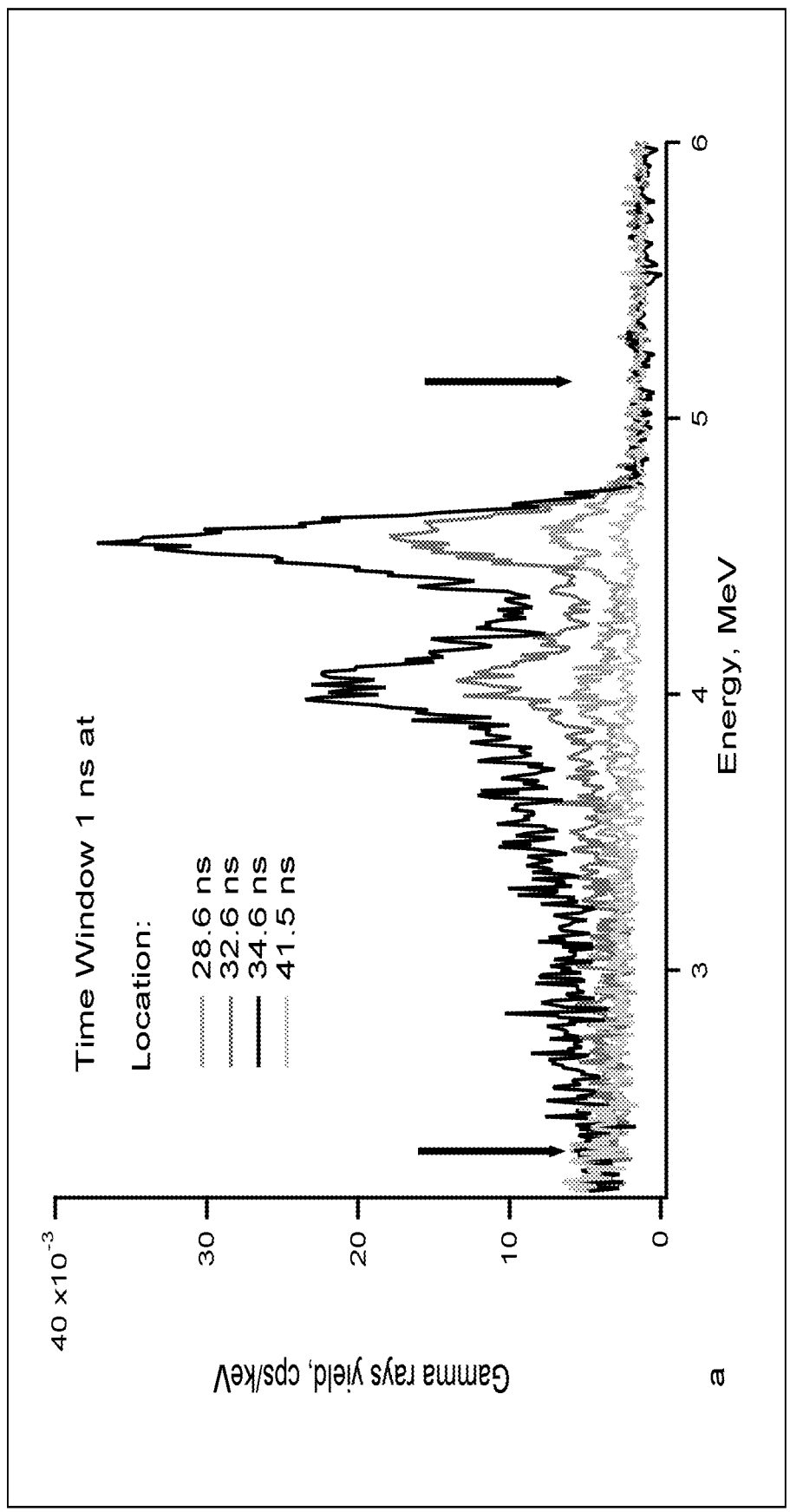
FIGS. 10A and 10B show the time correlated gamma spectra of graphite brick measured at different time windows (see FIG. 9).
Figure 10B:
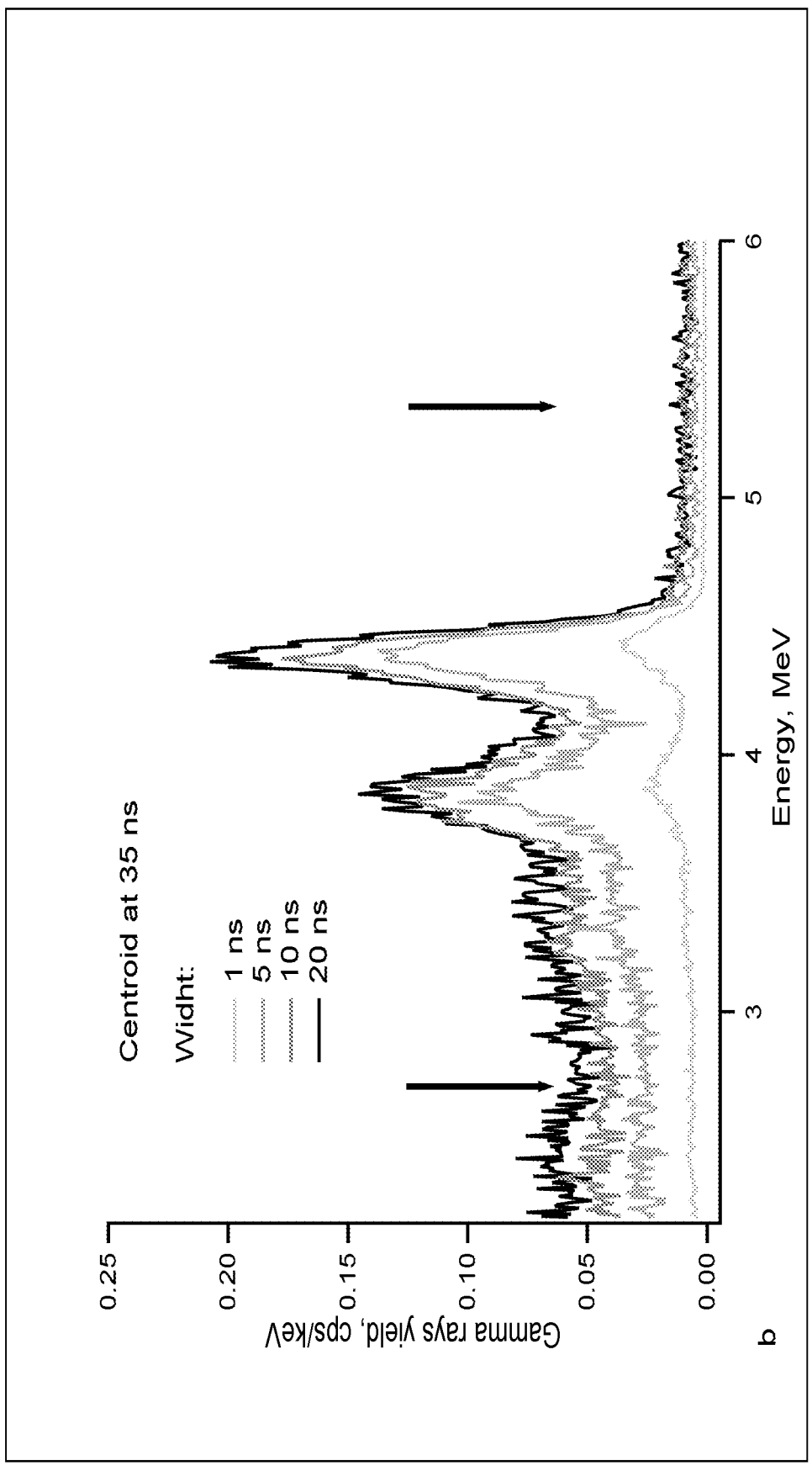

The net timing spectra of the graphite sample for the whole energy range and for the 4.44 MeV energy range are shown in FIG. 9. Lines with arrows and bars in this figure mark the time window for gamma spectra measurement. Measurements show that varying time windows (location and width) strongly influence the intensity of the time-correlated energy spectra while their shape are approximately the same. The time correlated energy spectra measured at different locations at a fixed window width (1 ns), and at a fixed centroid location (35 ns) with different widths are shown in FIGS. 10A and 10B respectively. Specifically, in FIG. 10A, the time window width (1 ns) location varied; in FIG. 10b the centroid of time window was at 35 ns, and the width varied. The energy window for area calculation are shown by arrows. The carbon-12 photopeak at 4.44 MeV and single escape peak at 3.93 MeV can be noted in spectra.

To estimate the efficiency of carbon registration in the continuous and API modes, the sensitivity, SNR, and MDL were calculated. Spectra measured in the API mode for different time windows (some shown in FIG. 10) were used for these calculations. The energy window in which the areas under the spectral curve were calculated is shown in FIG. 10 (the range where sample signal is stronger than background). The same energy window was used to calculate sensitivity, SNR, and MDL for continuous mode measurements. Specifically, equation (1) was used to calculate sensitivity (S, cps/kg C) was:

$$S = \frac{P_{sample} - P_{BKG}}{m_{sample}} \qquad (1)$$

where $P_{sample}$ is the area under the sample spectrum within the marked range (cps), $P_{BKG}$ is area under the background spectra in the same range (cps), and $m_{sample}$ is mass of the graphite brick used as a sample (8.6 kg). The signal to noise ratio (SNR) was calculated by equation (2):

$$SNR = \frac{P_{sample} - P_{BKG}}{P_{BKG}} \qquad (2)$$

The minimal detectible level (MDL) in kgC for 1 hour of measurement was calculated based on the equation [16, 17] as:

$$MDL = \frac{2.71 + 4.65 \cdot \sqrt{P_{BKG} \cdot 3600 \cdot \left(1 - \frac{DT_{BKG}}{100}\right)}}{\left[P_{Sample} \cdot \left(1 - \frac{DT_{sample}}{100}\right) - P_{BKG} \cdot \left(1 - \frac{DT_{BKG}}{100}\right)\right] \cdot 3600} \cdot m_{sample} \qquad (3)$$

where $DT_{BKG}$, and $DT_{sample}$ are dead times for the measured spectra, %.

Figure 11A:
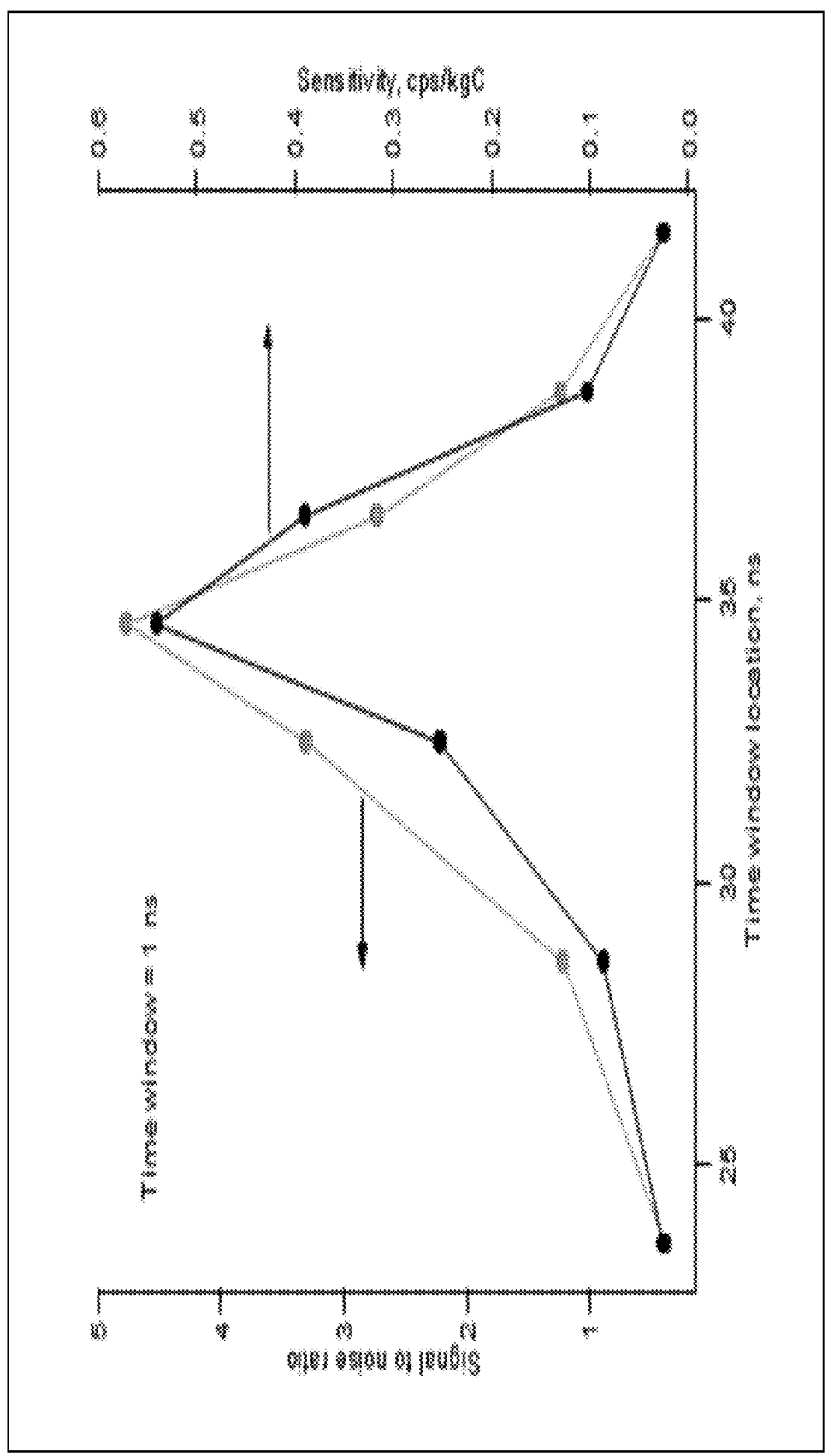
FIG. 11A shows the relationship between signal to noise ratio (SNR), sensitivity, and the time window location.
Figure 11B:
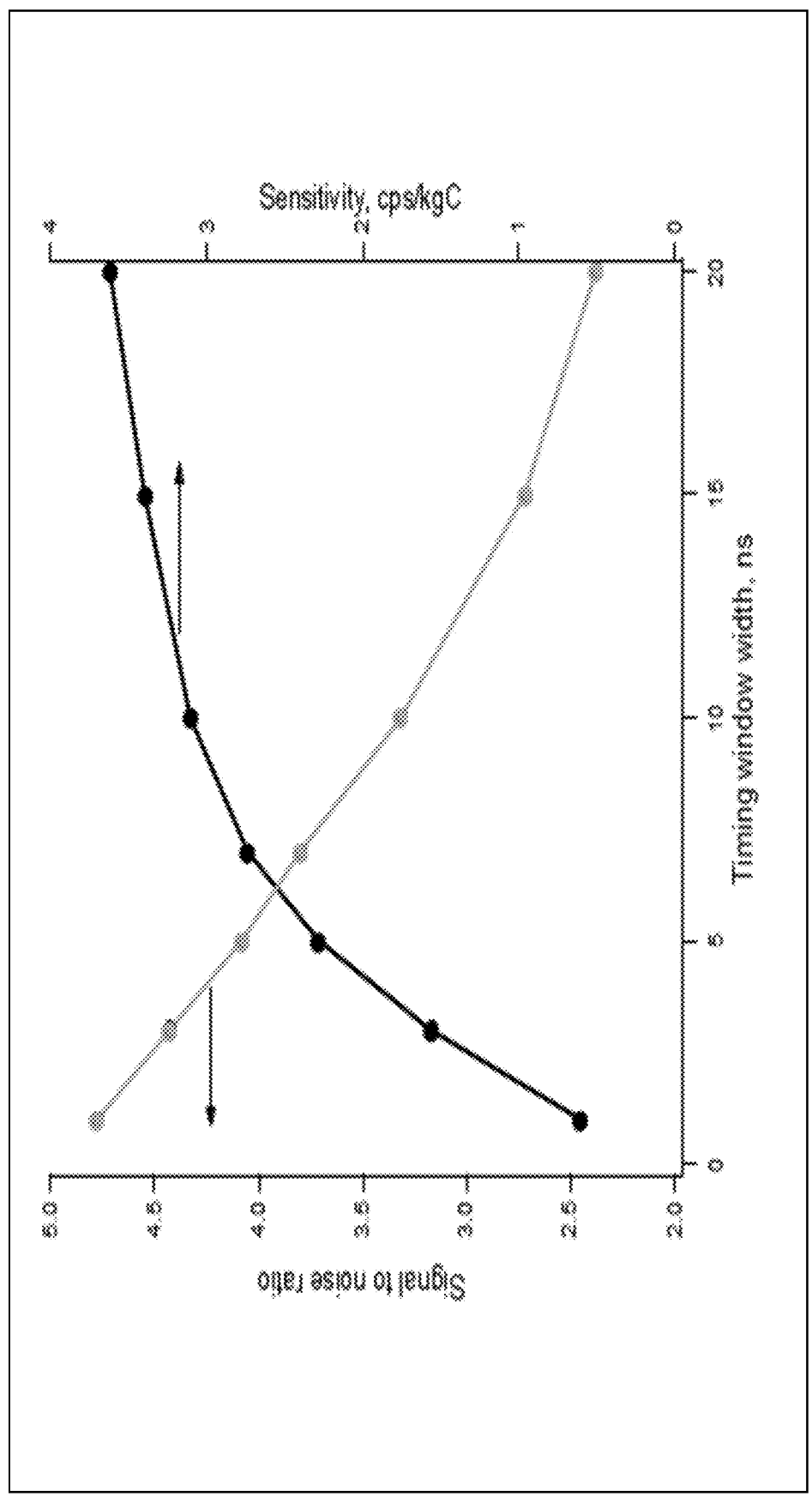
FIG. 11B shows the relationship between SNR, sensitivity, and the time window width.
Figure 11C:
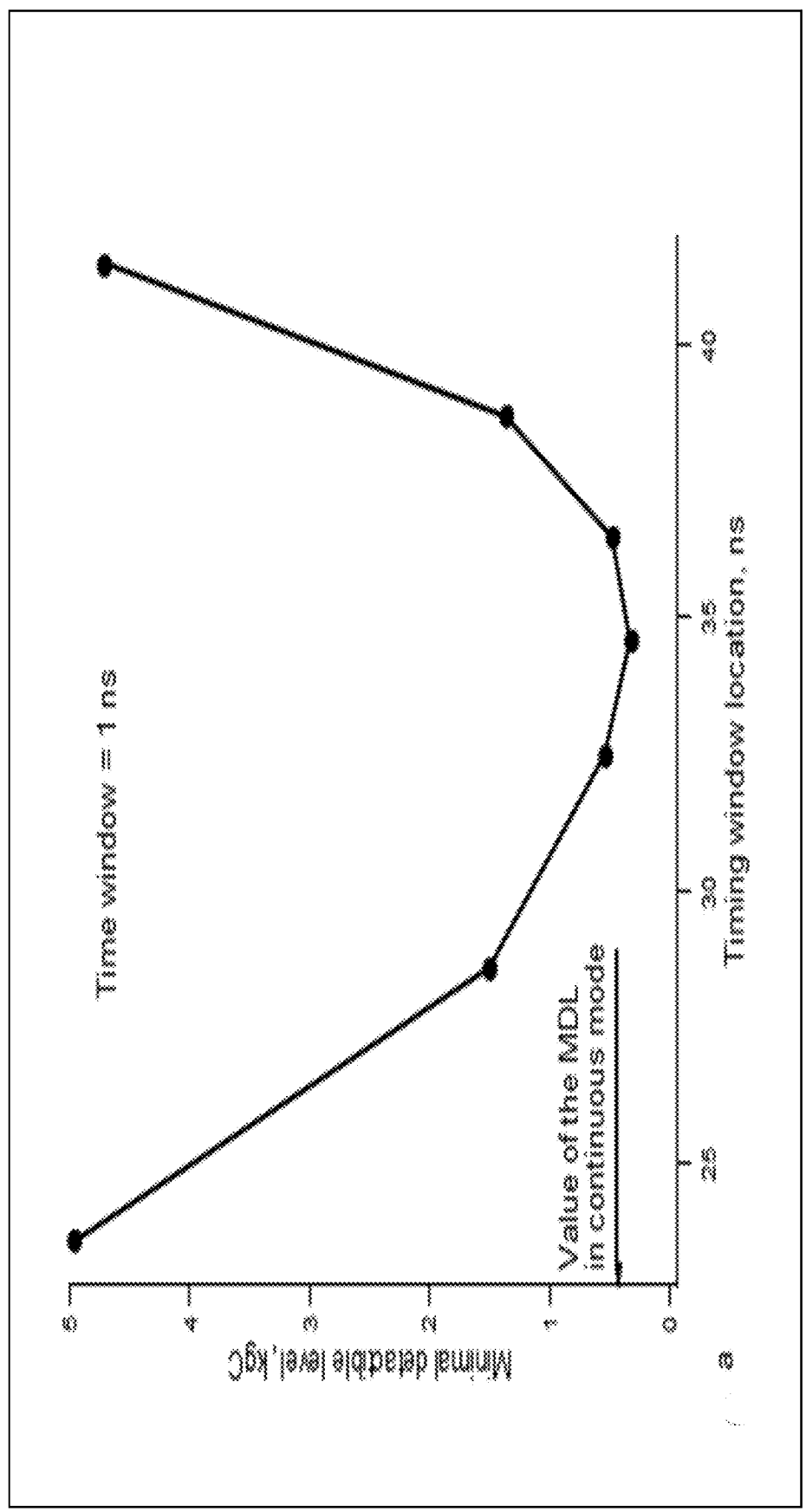
FIG. 11C shows the relationship between the minimum detectable level (MDL) and the timing window location.
Figure 11D:
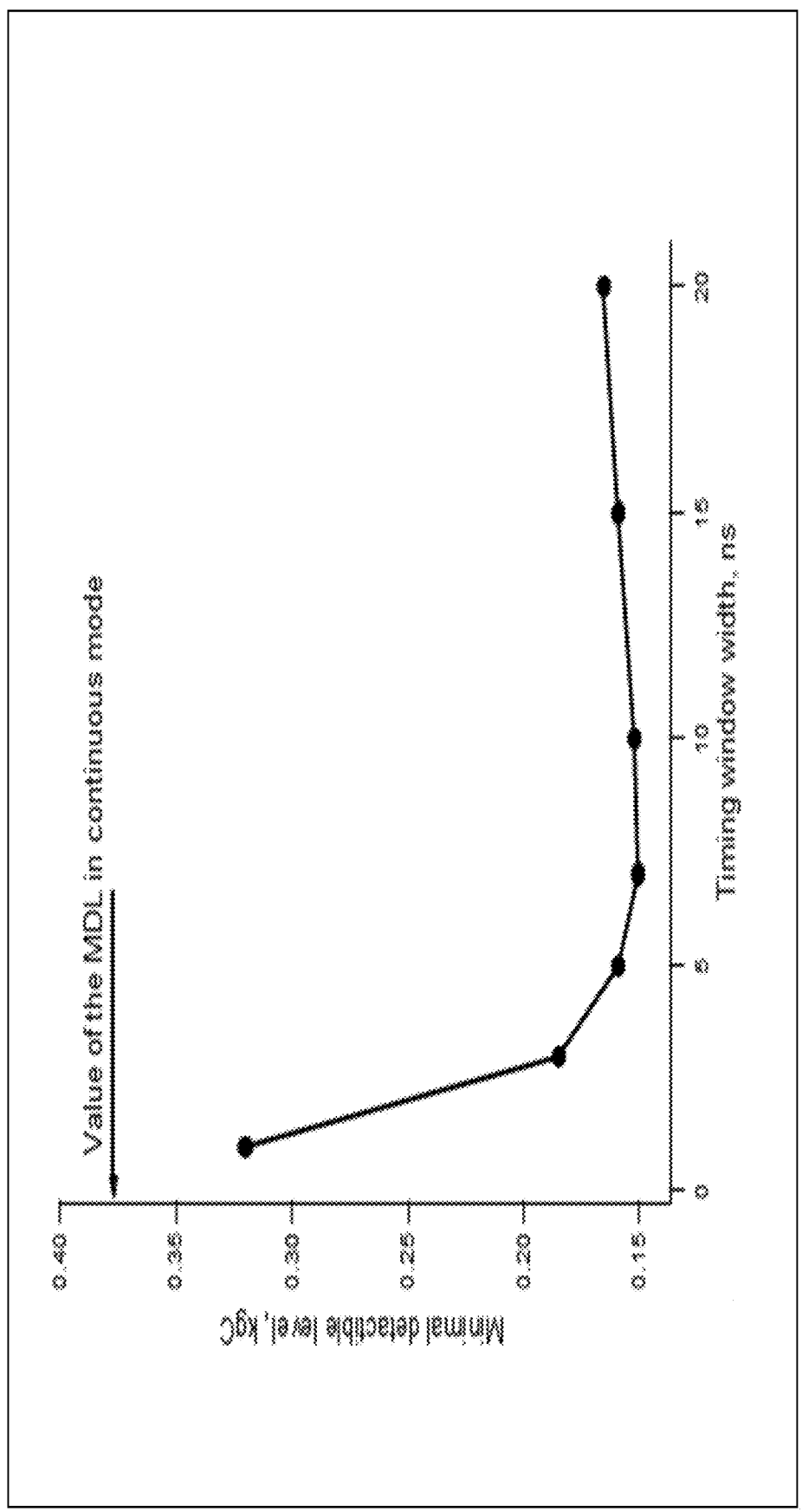
FIG. 11D shows the relationship between the MDL and the timing window width.

As expected, the calculated sensitivity for the continuous mode (~13 cps/kg C) was much large than for API mode, while the SNR is much larger in API than in continuous mode (~0.14). Changing the narrow (1 ns) time window along the time axis in the timing spectra (see FIG. 9) shows that sensitivity and SNR are maximum (see FIG. 11A) at the position coinciding with the peak position in the energy correlated timing spectra; MDL has minimal (best) value here (see FIG. 11C). Increasing the width of the time window from 1 to 20 ns (midpoint coincides with peak position in the energy correlated timing spectra) decreases SNR and increases sensitivity (see FIG. 11B). The MDL reaches the minimal value when the time window width is near 7 ns (see FIG. 11D). This MDL value (~0.15 kg C) is approximately 2.5 times better than for measurements in the continuous mode (~0.38 kg C). This result demonstrates that the API measurement mode with an appropriate time window can significantly improve MDL (more than 2 times) for carbon analysis compare to the continuous mode.

Conclusion Based on the Experimental Data

The inventors conducted experiments and gathered data using a portable neutron generator system with built-in alpha detectors, sodium iodide gamma detectors, and conventional nanosecond electronics for data acquisition in different operational modes. During the experiments, the system measured neutron stimulated alpha-gamma coincidence timing spectra, time correlated gamma energy spectra, and energy correlated timing spectra. The experimental configuration used graphite bricks as a target to demonstrate that the API measurement mode with an appropriate time window can significantly improve MDL (2.5 times) for carbon analysis compared to a "continuous" mode. Based on system measurements (primarily of neutron speed of 5.2 cm/ns), the inventors were able to confirm/authenticate the design and accuracy of their system. The inventors' results demonstrate that the system can be used to determine the depths of buried objects such as discrete carbon masses, e.g., (at least) plant roots, and root crops, etc.).

REFERENCES

1. A. Sardet, B. Pérot, C. Carasco, G. Sannié, S. Moretto, G. Nebbia, C. Fontana, F. Pino, A. Iovene, C. Tintori. (2018) Gamma signatures of the C-BORD Tagged Neutron Inspection System. EPJ Web of Conferences 170, 07011, https://doi.org/10.1051/epjconf/201817007011
2. M. Gierlik, S. Borsuk, Z. Guzik, J. Iwanowska, Ł. Kaźmierczak, S. Korolczuk, T. Kozlowski, T. Krakowski, R. Marcinkowski, L. Swiderski, M. Szeptycka, J. Szewiński, A. Urban. (2016) SWAN—Detection of explosives by means of fast neutron activation analysis. Nuclear Instruments and Methods in Physics Research A 834:16-23
3. E. P. Bogolyubov, A. V. Gavryuchenkov, M. D. Karetnikov, D. I. Yurkov, V. I. Ryzhkov, V. I. Zverev. (2017) Neutron generators and DAQ systems for tagged neutron technology. Proceedings of the XXVI International Symposium on Nuclear Electronics & Computing (NEC'2017), Becici, Budva, Montenegro, September 25-29.
4. S.-W. Jing, Y. Guo, Y.-L. Zheng, Q. Wang, G.-B. Wang. (2015). Detection of explosives hidden in package by using tagged neutron method. Nuclear Electronics & Detection Technology 35(7):721-725
5. A. A. Faust, J. E. McFee, C. L. Bowmana, C. Mosquera, H. R. Andrews, V. D. Kovaltchouk, H. Ing. (2011) Feasibility of fast neutron analysis for the detection of explosives buried in soil. Nuclear Instruments and Methods in Physics Research A 659:591-601.
6. V. Valkovic (2016)14 MeV Neutrons: Physics and Applications. CRC Press: Taylor & Francis Group; 481 p. DOI:10.1063/1.3120103
7. D. L. Chichester, M. Lemchak, J. D. Simpson. (2005) The API 120: A portable neutron generator for the associated particle technique Nuclear Instruments and Methods in Physics Research B 241:753-758
8. M. Moszyński, M. Kapusta, D. Wolski, W. Klamra, B. Cederwall. (1998) Properties of the YAP: Ce scintillator. Nuclear Instruments and Methods in Physics Research Section A: Accelerators, Spectrometers, Detectors and Associated Equipment 404(1):157-165.
9. Sodium-iodide-material-data-sheet. https://www.crystals.saint-gobain.com/sites/ . . . /sodium-iodide-material-data-sheet_0.pdf.
10. S. Mitra. (2011) Identification of UXO using the associated particle neutron time-of-flight technique. Final Report. BNL-96489-2011, https://pdfs.semanticscholar.org/9542/d7ff7b0f7fce26cdeaa3eff8edae4b421a29.pdf
11. B. Perot, C. Carascoa, S. Bernard et al. (2008). Measurement of 14 MeV neutron-induced prompt gamma-ray spectra from 15 elements found in cargo containers. Applied Radiation and Isotopes 66: 421-434
12. D. Sudac, S. Blagus, V. Valkovic (2004). Chemical composition identification using fast neutrons Applied Radiation and Isotopes 61:73-79
13. P. A. Hausladen, J. S. Neal, J. T. Mihalczo (2005). An alpha particle detector for a portable neutron generator for the Nuclear Materials Identification System (NMIS). Nuclear Instruments and Methods in Physics Research Section B: Beam Interactions with Materials and Atoms, 241:835-838
14. W. El Kanawati, B. Perot, C. Carasco, C. Eleon, V. Valkovic, D. Sudac, J. Obhodas, G. Sannie (2011) Acquisition of prompt gamma-ray spectra induced by 14 MeV neutrons and comparison with Monte Carlo simulations. Applied Radiation and Isotopes 69: 732-743
15. F. C. Engesser, W. E. Thompson. (1967) Gamma rays resulting from interactions of 14.7 MeV neutrons with various elements. Journal of Nuclear Energy 21(6):487-507.
16. G. Gilmore. (2008) Practical Gamma-Ray Spectrometry, second ed. John Wiley & Sons, LtD West Sussex, England.
17. G. Yakubova, A. Kavetskiy, S. A. Prior, H. A. Torbert. (2017) Applying Monte-Carlo simulations to optimize an inelastic neutron scattering system for soil carbon analysis. Applied Radiation and Isotopes 128:237-248.

For the foregoing reasons, it is clear that the method and apparatus described herein provides an innovative Associated Particle Imaging system (API). The current system may be modified in multiple ways and applied in various technological applications. The disclosed method and apparatus may be modified and customized as required by a specific operation or application, and the individual components may be modified and defined, as required, to achieve the desired result.

Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

The amounts, percentages and ranges disclosed herein are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Similarly, if the term "about" precedes a numerically quantifiable measurement, that measurement is assumed to vary by as much as 10%. Essentially, as used herein, the term "about" refers to a quantity, level, value, or amount that varies by as much 10% to a reference quantity, level, value, or amount.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein.

What is claimed is:

1. A nondestructive method of identifying buried target material, the steps of the method comprising:
    (a) providing a field-portable device for making non-invasive measurements of elemental content using a neutron generator with an Associated Particle Imaging system (API) particle alpha detectors;
    (b) positioning the device above a buried target material in an investigated area;
    (c) emitting at least one tagged neutron and a corresponding tagged alpha particle from a source on the device neutron generator;
    (d) detecting the tagged alpha particle with an alpha particle detector and recording the tagged alpha particle emission time and trajectory as comprising tagged alpha particle data;
    (e) using the tagged alpha particle data to determine the tagged neutron emission time and trajectory, and recording the tagged neutron emission time and trajectory as tagged neutron data;
    (f) penetrating the target material with a tagged neutron so that the neutron interacts with a nucleus of the target material, and the interaction causes an emission of nucleus-specific gamma rays from inelastic neutron scattering;
    (g) registering/detecting the nucleus-specific gamma rays at a gamma detector on the device to complete a tagged event;

(h) recording an alpha-gamma event time for the tagged event, the collective alpha-gamma event times for all tagged events comprising an alpha-gamma event time distribution;

(i) examining the alpha-gamma event time distribution spectra for peaks from buried material and determining a peak occurrence time;

(j) measuring alpha-gamma event time distribution spectra to determine differences in the neutron emission time, and occurrence time of the nucleus-specific gamma spectra peak, the measured time corresponding to a distance traveled by the tagged neutron to the target material nucleus, and distance traveled by nucleus-specific gamma rays to the gamma detector (assuming a known/reference speed of light of about 30 centimeters/nanosecond);

(k) utilizing the measured time to determine distance from the neutron generator neutron source to the buried target material in the investigated area without the use of Compton cameras and/or an electronic circuit adapted for three-dimensional imaging.

2. The method of claim 1 wherein, in step (k), the distance from the neutron source correlates with a burial depth of the target material in the investigated area.

3. The method of claim 1 further comprising:

(l) utilizing time correlated energy spectra within specific time increments to collimate data for examination of buried material;

(m) comparing the time correlated energy spectra to known reference material time correlated energy spectra to determine element content of buried material.

4. The method of claim 1, wherein in step (c), multiple tagged neutrons and corresponding tagged alpha particles are simultaneously generated in an event pulse.

5. The method of claim 4, wherein a time delay between detection of gamma rays emitted during a tagged event, and alpha particle data detected in step (d) indicates a position of the buried material in a cone of investigation.

6. The method of claim 5 wherein the particle alpha detector of step (a) comprises a photomultiplier and defines the cone of investigation.

7. The method of claim 6 wherein cone of investigation angle $\Omega$ is about 0.41 steradian units.

8. The method of claim 1 wherein in step (a), the neutron generator produces neutron flux by accelerating deuterium ions into a tritium target, thereby producing the at least one tagged neutron and the corresponding tagged alpha particle described in step (c).

9. The method of claim 1 wherein, in step (a), the particle alpha detector is built into the neutron generator.

10. The method of claim 1 wherein the at least one tagged neutron and the corresponding tagged alpha particle described in step (c) are present at 14.1 and 3.5 MeV respectively.

11. The method of claim 1 wherein, in step (a) the field portable device comprises polyethylene-lead shielding between the gamma detector and the neutron generator.

12. The method of claim 7 wherein the polyethylene thickness is about 15 cm and the lead thickness is about 15 cm.

13. The method of claim 1 wherein in step (g) the gamma detector comprises a sodium iodide-activated gamma detector with scintillation crystals.

14. The method of claim 13 wherein the sodium iodide-activated gamma detector has scintillation crystals of about 10 cm×10 cm×48 cm.

15. The method of claim 1 wherein in step (a), the field portable further comprises a monitoring/controlling computer system that is in electronic communication with the neutron generator assembly and the gamma ray detector processor/controller.

16. The method of claim 15 wherein the monitoring/controlling computer system comprises a computer laptop.

17. The method of claim 16 wherein the laptop is used to control the detection system.

* * * * *